(12) United States Patent
Liu et al.

(10) Patent No.: US 10,976,454 B2
(45) Date of Patent: *Apr. 13, 2021

(54) MICROSEISMIC MONITORING SYSTEM

(71) Applicant: Sichuan University, Chengdu (CN)

(72) Inventors: Jianfeng Liu, Chengdu (CN); Lu Wang, Chengdu (CN); Jianliang Pei, Chengdu (CN); Huining Xu, Chengdu (CN); Wenxi Fu, Chengdu (CN); Xiaozhang Lei, Chengdu (CN); Jianhui Deng, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 434 days.

This patent is subject to a terminal disclaimer.

(21) Appl. No.: 16/008,012

(22) Filed: Jun. 13, 2018

(65) Prior Publication Data

US 2018/0364379 A1    Dec. 20, 2018

(30) Foreign Application Priority Data

Jun. 14, 2017    (CN) .......................... 201710447588.9

(51) Int. Cl.
*G01V 1/16*    (2006.01)
*G01V 1/18*    (2006.01)
(Continued)

(52) U.S. Cl.
CPC .............. *G01V 1/166* (2013.01); *G01V 1/181* (2013.01); *G01V 1/202* (2013.01); *G01V 1/22* (2013.01); *G01V 1/3817* (2013.01); *G01V 1/3843* (2013.01); *G01V 2210/123* (2013.01); *G01V 2210/1232* (2013.01); *G01V 2210/142* (2013.01); *G01V 2210/1429* (2013.01)

(58) Field of Classification Search
CPC .......... G01V 1/166; G01V 2210/1429; G01V 1/181; G01V 2210/123; G01V 2210/1232
See application file for complete search history.

(56) References Cited

U.S. PATENT DOCUMENTS

| 9,016,360 B2* | 4/2015 | Cheon | G01V 1/008 |
| | | | 166/66 |
| 2003/0179651 A1* | 9/2003 | Nutt | G01V 1/40 |
| | | | 367/25 |
| 2019/0011581 A1* | 1/2019 | Zheng | G01V 1/166 |

* cited by examiner

*Primary Examiner* — Ian J Lobo
(74) *Attorney, Agent, or Firm* — Bayramoglu Law Offices LLC (57) ABSTRACT

The present invention discloses a microseismic monitoring system, which includes at least a microseismic sensor, a push rod set at both ends of the microseismic sensor through the first connecting mechanism for sending the microseismic sensor into a monitoring hole, a guide mechanism installed on the push rod for guiding the microseismic sensor into the monitoring hole, and a microseismic monitoring computer connecting with the microseismic sensor signal. The microseismic sensor is reusable. The first connecting mechanism can make the push rod swing relative to the microseismic sensor. The guide mechanism is a three-roller guide mechanism. The present invention can satisfy the need of monitoring different locations in monitoring holes with large depths for multiple microseismic sensors, and solve problems of effective contact coupling between the microseismic sensors and monitoring holes, which improves the accuracy of microseismic monitoring and reduces the cost of a microseismic monitoring system.

20 Claims, 5 Drawing Sheets

(51) Int. Cl.
*G01V 1/20* (2006.01)
*G01V 1/38* (2006.01)
*G01V 1/22* (2006.01)

MICROSEISMIC MONITORING SYSTEM

CROSS REFERENCE TO RELATED APPLICATIONS

This application is based upon and claims priority to Chinese Patent Application No. CN2017104475889, filed on Jun. 14, 2017, the entire contents of which are incorporated herein by reference.

TECHNICAL FIELD

The present invention relates to the field of geological engineering microseismic monitoring technology, particularly to a microseismic monitoring system.

BACKGROUND

The deformation and destruction of rock(mass) in engineering construction, especially the dynamic disaster of rockburst, will directly endanger the construction safety of the project, and even cause catastrophic impact. Therefore, the effective monitoring and prediction of rock(mass) stability and dynamic disasters of rockburst is one of the important contents of engineering construction safety. As an important means of nondestructive monitoring, microseism is used in monitoring and prediction of rock(mass) stability and rockburst dynamic disasters in engineering construction.

In order to accurately predict the potential deformation and dynamic disasters of wall rock in the process of wall rock excavation in underground construction, the microseismic monitoring sensor needs to be fixed in advance by surrounding the wall rock area to be monitored, prior to the excavation. Using microseismic techniques to accurately determine the position where the deformation and dynamic disaster of the wall rock may occur, the microseismic sensor needs to be arranged around the rock mass to be monitored in three-dimensional space distribution. The more the sensors that are arranged, the more correct distribution of the sensors is, the more accurate the monitoring result is. In order to fulfill the real-time monitoring of the rock excavation process, the monitoring hole is drilled in the rock(mass) by the drilling machine before the rock(mass) is excavated, and the microseismic sensor is installed in the monitoring hole.

The depth of the monitoring hole depends on the depth of the excavation and the monitoring range. As the depth of the project and the the monitoring range increase, the depth of the monitoring hole also increases. Some of the monitoring holes are very deep, with measurements of over tens of meters deep or even hundreds of meters deep. For the monitoring holes even deeper than those depths, it is usually necessary to use several microseismic sensors to monitor the different parts of the monitoring holes. The deeper the monitoring hole is, the more microseismic sensors need to be installed. It is difficult to keep concentric for the monitoring hole, and it is difficult for the inner walls of the hole to maintain a smooth surface. The monitoring hole without a smooth surface makes the installation of microseismic sensors in the monitoring holes with increased depths even more difficult.

The microseismic sensor is expensive. In order to reduce the projected cost and retrieve the sensor(s) upon completion of monitoring, in the field installation of microseismic monitoring sensors used in the project, the microseismic sensors are usually put directly in the monitoring hole, which depends on the residual water in the monitoring hole as the medium for the signal transmission between the rock mass and the sensor. However, the above mentioned method has the following disadvantages:

First, the direction of the monitoring hole must be downward vertically. For the upward monitoring holes with a certain angle or full horizontal monitoring holes, this method is not applicable.

Second, for sloped or downward monitoring holes, the rock mass needs to be relatively intact. The water injected in the monitoring holes can be maintained instead of losing water along the cracks in the monitoring holes, or the water can not seep out of the monitoring holes. The sensor must always be submersed in water in order to function properly. It is difficult to submerse the sensor in water while operating in the field.

Third, although water can be used as the coupling medium for signal transmission, due to the low density of water, the transmission efficiency of water is not as effective as microseismic sensor contacted with the rock wall directly.

Fourth, because the liquid can only transmit the longitudinal waves and not transverse waves, and the confirmation of the position of the rock rupture signal usually must depend on the transverse wave signal, therefore, the aforementioned method leads to the loss of a lot of monitoring signals and the decrease in reliability of the monitoring results.

In order to ensure the effective coupling between the microseismic sensor and the wall of the monitoring hole, sometimes the concrete is poured into the monitoring hole to integrate the sensor and the rock wall. This method has the following disadvantages: first, the sensor after pouring is not recoverable, resulting in high economic cost.

Second, if the sensor is found to have no signal or bad signal after pouring, it cannot be checked or repaired. Therefore, in order to ensure the proper monitoring, it is necessary to drill a new hole and install a new microseismic sensor again, which not only is time-consuming and laborious, but also leads to high economic cost.

Third, when the cement slurry is poured into the monitoring hole, it is difficult to ensure that the sensor will be grouted in the correct position during this type of sensor installation. If the sensor is not effectively grouted in the correct position during installation, then no monitoring signal will be obtained due to the incorrect coupling of the sensor to the rock wall. Furthermore, the deeper the monitoring hole is, the greater the total shrinkage deformation of the cement after solidification is. Thus, the signal transmission cable bonded with the cement will be subjected to tension due to the shrinkage and deformation of the cement, resulting in the failure to transmit the signal effectively.

Fourthly, the monitoring holes are usually damp. After grouting, it takes a longer period to solidify the cement slurry, which will lead to a longer construction period.

Fifthly, during the excavation process, the blasting of explosives may result in the loosening between the grouting surface and the rock surface, which will lead to the reduction of the efficiency of the monitored signal transmission.

Sixthly, the sensor installation process is time-consuming and laborious, requiring a series of professional grouting equipment and grouting technical personnel and a large number of labors.

In the engineering application, the microseismic sensor is fixed in a specific device by means of a simple fixing device. Then the microseismic sensor is sent to fix in the installation position by a rigid unmovable metal rod. However, installation of the microseismic sensor has the following disadvantages: first, the method is generally applicable only to the monitoring holes with a shallow depth. The monitoring holes need to be completely concentric and the walls of the hole must be smooth. It's difficult to ensure those requirements are met in the actual construction. Second, the installation device is large in size. It is only applicable to the monitoring holes with large diameter, which leads to the high cost of the monitoring holes. Third, the whole transmission rod and the installation structure are inserted into the monitoring hole by means of exerting a force, which not only procures the high friction and wears away the cable(s) or microseismic sensor(s) easily, but also the whole transmission rod and the installation structure are easy to be stuck in the monitoring hole, resulting in the failure of sending the microseismic sensor to a specific location. Fourth, the installation process is time-consuming and laborious, requiring several hours of labor. These described difficulties lead to the limit of the application of microseismic sensors in the monitoring holes with larger depth.

Therefore, how to install the microseismic sensor in the monitoring holes conveniently and effectively and how to effectively couple the microseismic sensor with the wall of the hole after installation are still difficult problems in the field monitoring and research at present. In particular, multiple microseismic sensors are needed for microseismic monitoring holes with high depth in different locations.

SUMMARY

Aiming at the current situation and shortcomings of the microseismic monitoring technology, the present invention provides a microseismic monitoring system in order to solve problems of effective contact coupling between the microseismic sensors and monitoring holes; the reuse and the conveniences of installation of the prior art, which improves the accuracy of microseismic monitoring and reduces the cost of microseismic monitoring system.

The microseismic monitoring system provided by the present invention includes at least a microseismic sensor, a push rod that is set at both ends of the microseismic sensor through a first connecting mechanism for sending the microseismic sensor into a monitoring hole; a guide mechanism that is installed on the push rod for guiding the microseismic sensor into the monitoring hole, and a microseismic monitoring computer that connects the microseismic sensor signal. The microseismic sensor is a reusable microseismic sensor and includes a microseismic probe, a holding part of a microseismic probe, a supporting plate supported on the wall of the monitoring hole and a second connecting mechanism for connecting the holding part to the supporting plate. The holding part can achieve the contact coupling between the lower surface of the holding microseismic probe held by the holding part and the wall surface of the monitoring hole. The side surface of the supporting plate is an arc plate surface. The second connecting mechanism includes at least two spring sleeves set along the longitudinal direction of the microseismic probe on the holding part, a spring guide rod, wherein the spring guide rod is set on the non-supported side surface of the supporting plate, and the spring guide rod is disposed on the holding par corresponding to the spring sleeve; a telescopic spring set inside the spring sleeve is sleeved on the spring guide rod, a second bolt used as a spring seat for the lower end of the telescopic spring vertically penetrates the wall of the spring sleeve and a first bolt vertically penetrates the spring sleeve wall and the spring guide rod. The microseismic sensor is disposed in the monitoring hole. When the first bolt is pulled out, the lower surface of the microseismic probe and the supporting side arc plate surface of the supporting plate are effectively coupled with the inner wall of the monitoring hole under the action of the telescopic spring in order to monitor the vibration of the rock mass. The connecting mechanism can make the push rod swing relative to the microseismic sensor. The guide mechanism is a three-roller guide mechanism.

In order to better solve the technical problems by the present invention, the following technical solutions can be further adopted. The solutions may be taken individually or in combination.

The holding part is a probe sleeve including a straight cylinder with an open structure and a cone head. The shape and structure of the inner cavity of the probe sleeve are matched with the shape and structure of the microseismic probe. The lower surface of the microseismic probe, which is set inside the probe sleeve and the cone end of the microseismic probe, is exposed.

The spring sleeves are fixed perpendicular to the probe sleeve on both sides of the probe sleeve, 2 or 3 spring sleeves are set on each side. Further, it is best that the spring sleeve is fixed on both sides of the probe sleeve in a manner allowing the spring sleeve to be perpendicular and symmetrized to the axis of the microseismic probe. The structure of all spring sleeves of the present invention are the same, the structure of all the spring guide rods of the present invention are the same and the structure of all telescopic springs of the present invention are the same, and the spring sleeve, the spring guide rods and the telescopic springs constitute the connecting mechanism.

The end of the probe sleeve is provided with an end cover connected with the sleeve body through a screw threaded pair. The microseismic probe is fixed in the sleeve cavity through the end cover.

The first bolt and the second bolt at each joint of the second connecting mechanism are all integral structural bolts, namely, a bolt rod vertically penetrating all the spring sleeve walls is used as the second bolt is used at each joint; and t a bolt rod vertically penetrating all spring sleeve walls and spring guide rods is used as the first bolt at each joint. Further, it is best that the bolt rod acting as the first bolt and the bolt rod acting as the second bolt are provided with a pull cord to pull out the bolt rod at the position corresponding to the tail end of the microseismic probe.

The spring guide rod is designed with an upper spring seat of the telescopic spring. The telescopic spring is installed in the spring sleeve through the spring seat. In the process of installing the microseismic sensor in the inspection and monitoring hole, the bolt passes across the spring guide rod through a bolt hole above the spring seat. The spring guide rod may also be designed with no spring seat, wherein the design of an installation slot on the spring sleeve is adopted, installing the telescopic spring in the spring sleeve through the installation slot. In the process of installing the microseismic sensor in the detection and monitoring hole, the bolt is used as the upper spring seat for the telescopic spring.

The first connecting mechanism includes a connecting frame, a threaded sleeve and a connecting rod. One end of the connection frame is fixed to one end of the microseismic sensor, and the other end is articulated with the threaded sleeve through a hinged structure. One end of the connecting rod is machined into an external thread that is matched with the threaded sleeve, and the other end of the connecting rod is a polyhedral cylinder. One end of the push rod is connected with the first connecting mechanism which is then connected with a polyhedral cylindric hole. Finally, the polyhedral cylinder is socketed and matched with the polyhedral of the connecting rod. The other end of the push rod is machined into an extended connection structure. The polyhedral cylinder hole of the push rod and the polyhedral cylinder of the connecting rod constitute a polyhedral socketed structure, and the polyhedral cylinder of the connecting rod is fixed in the polyhedral cylinder hole of the push rod through the fastening screw. The polyhedral socketed structure can be a tetrahedral socketed structure, a hexahedral socketed structure or an octahedral socketed structure. However, the hexahedral socketed structure is preferred.

The extended connection structure of push rod can be a threaded connection structure, a lap joint structure, a socketed connection structure and so forth, as long as the extended connection structure can match with the counterpart to form the connection pair. Further, the connecting frame in the connection mechanism can be designed to be composed of a ring matched with a microseismic sensor, a connecting head and two connecting arms with folded structures. Two connecting arms are disposed symmetrically. One end of each of the connecting arms is fixed to the ring, and the other end is connected to the connecting head. The connecting frame is articulated with the threaded sleeve through the connecting head, so that the push rod can swing relative to the microseismic sensor.

The roller guide mechanism is a three-roller guide mechanism. The three rollers of the three-roller guide mechanism are set in two diameters perpendicular to each other to move along the wall of the monitoring hole respectively, wherein one of the rollers is set opposite to the supporting plate in the microseismic sensor, the other two rollers are disposed opposite to each other.

The microseismic monitoring system provided by the present invention is used for microseismic monitoring. When the monitoring hole is deep, multiple microseismic sensors can be used for microseismic monitoring in different directions of the monitoring hole. The microseismic sensors can be connected by the extended connection structure and the extended rod at the end of the push rod, which constitutes the monitoring system needed for the extension.

The microseismic monitoring system provided by the present invention with reusable microseismic sensor, is suitable for monitoring holes with large depth and requiring multiple microseismic sensors to monitor different locations, which solves the problem of installation and effective coupling of the multiple microseismic sensors. The main features are as follows: first, the microseismic sensor is not only easy to install and implement, which saves a lot of man hours, but also overcomes the adverse effects of different depth and direction of the monitoring hole. Second, the microseismic sensor can be checked during the testing process, and the recovery and reuse of the microseismic sensor can be realized, which reduces the cost. Third, multiple sensors can be set in the same monitoring hole as needed. The first well-designed connecting mechanism can make the direction of the effective monitoring surface of each microseismic sensor be determined separately during the installation according to the monitoring requirements. Fourth, the second connection mechanism ensures that the microseismic sensor can be coupled with the monitoring hole wall effectively under the adverse restricted conditions, such as a breakage of rock mass or a very deep monitoring hole, which is difficult to ensure concentricity. Fifth, the rolling transmission in the installation process is actualized, which overcomes the influence of friction and ensures the integrity of the sensor and transmission cable. Sixth, the arc coupling surface of the supporting plate is designed to ensure the coupling effect and monitoring reliability. To summarize, the present invention not only ensures the installation and coupling effect, which improves the installation efficiency, but also ensures the recovery and reuse of the microseismic sensors, which saves money.

BRIEF DESCRIPTION OF THE DRAWINGS

FIGS. 7-1 and 7-2 are schematic diagrams of the connecting structure between the push rod and the microseismic sensor, wherein FIG. 7-1 is a frontal view of the connecting structure, and FIG. 7-2 is a top view of the connecting structure.

FIGS. 8-1, 8-2 and 8-3 are schematic diagrams of the push rod, wherein FIG. 8-1 is a frontal view, FIG. 8-2 is a left view and FIG. 8-3 is a top view.

FIGS. 9-1, 9-2 and 9-3 are schematic diagrams of the connecting rod, wherein FIG. 9-1 is a frontal view, FIG. 9-2 is a left view and FIG. 9-3 is a top view.

FIGS. 10-1, 10-2 and 10-3 are schematic diagrams of the guide mechanism, wherein FIG. 10-1 is an auxiliary view of C direction of the guide mechanism in FIG. 1, FIG. 10-2 is a left view of the guide mechanism shown in FIG. 10-1 and FIG. 10-3 is a top view of the guide mechanism shown in FIG. 10-1.

REFERENCE NUMBERS 1 microseismic sensor
2 push rod
3 guide mechanism
4 monitoring computer.
1-1 microseismic probe
1-2 end cover
1-3 supporting plate
1-4 second bolt
1-5 telescopic spring
1-6 spring guide rod
1-7 spring sleeve
1-8 probe sleeve
1-9 first bolt
1-10 pull cord
1-11 connecting frame
1-12 connecting threaded sleeve
2 push rod
2-1 connecting rod
2-2 push rod body
2-3 fastening screw.

DETAILED DESCRIPTION

Hereinafter, the microseismic monitoring system of the present invention will be described in detail with reference to the accompanying drawings and embodiments of the present invention.

Figure 1:
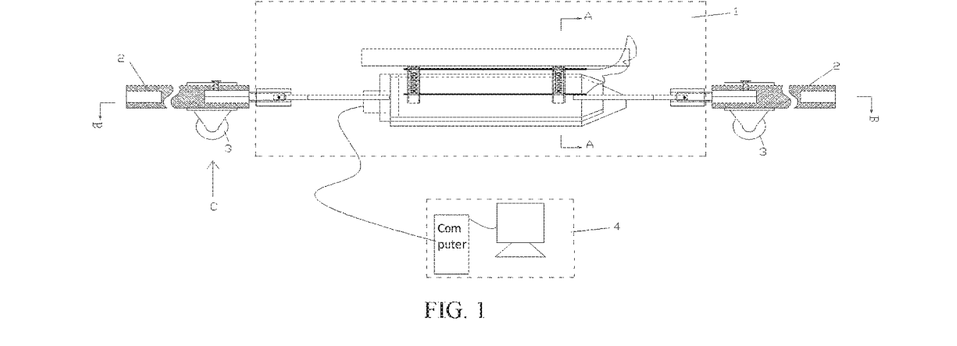
FIG. 1 is a front visual schematic diagram of the microseismic monitoring system of the present invention.
Figure 2:
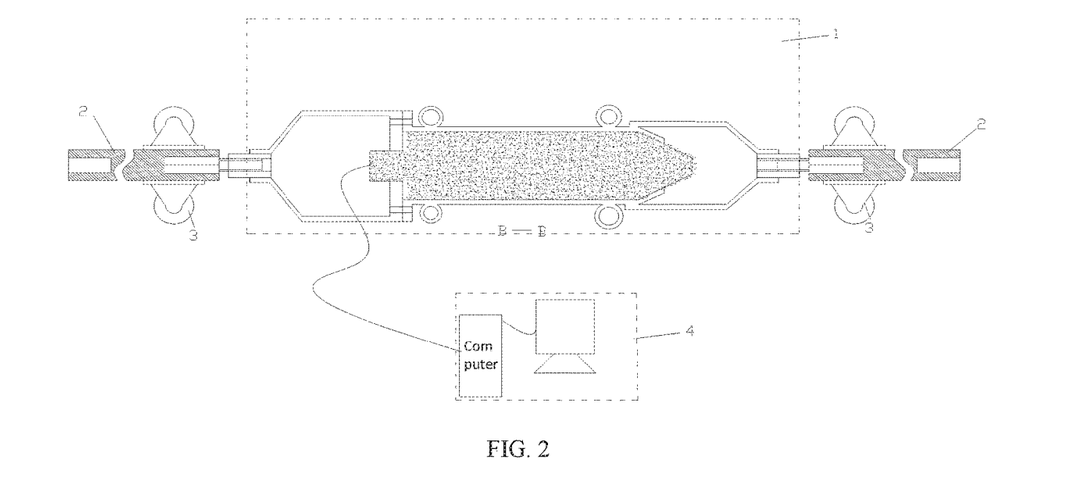
FIG. 2 is a sectional view of the B-B section (top view) in FIG. 1.
Figure 3:
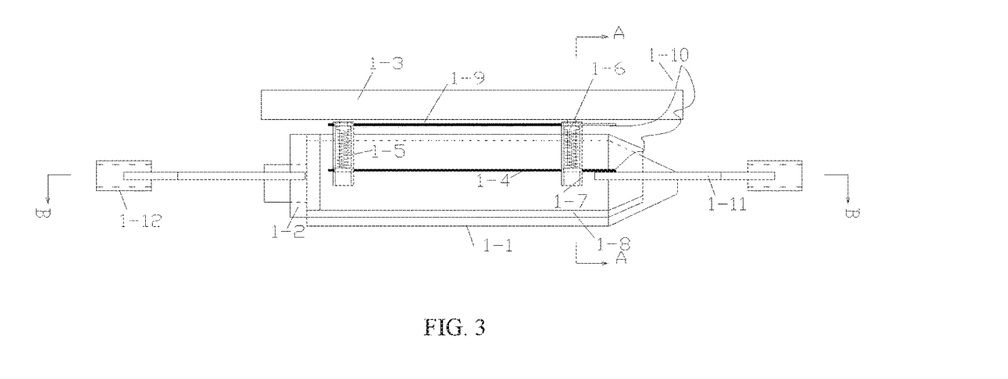
FIG. 3 is a partial enlarged drawing of 1 (microseismic sensor) in FIG. 1.
Figure 4:
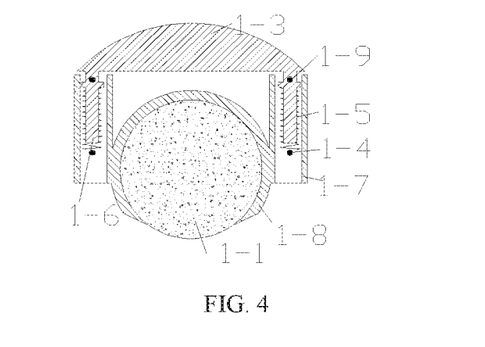
FIG. 4 is a sectional view of the A-A section in FIG. 1.
Figure 5:
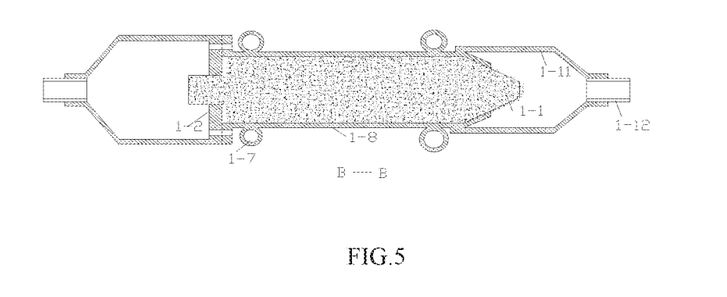
FIG. 5 is a partial enlarged drawing of 1 (top view) in FIG. 2.
Figure 6:
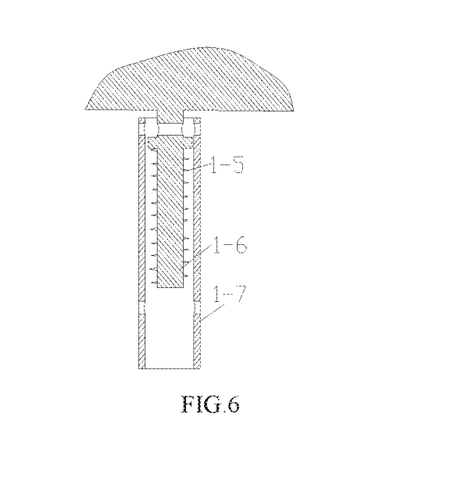
FIG. 6 is a schematic diagram showing the assembly of the telescopic spring in the microseismic sensor.
Figure 71:
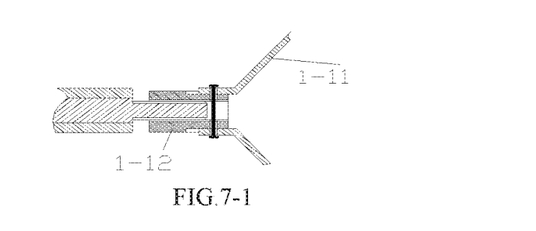
Figure 72:
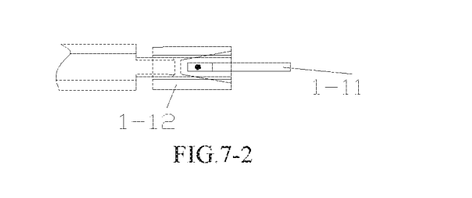
Figure 81:
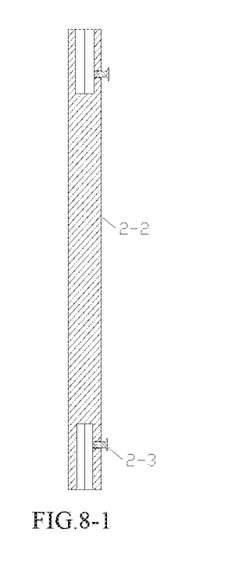
Figure 82:
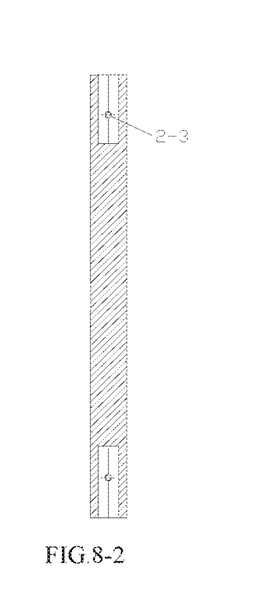
Figure 83:
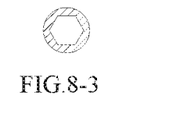
Figure 91:
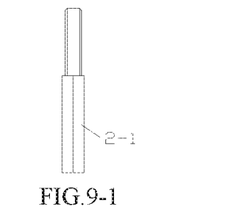
Figure 92:
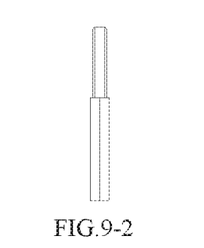
Figure 93:
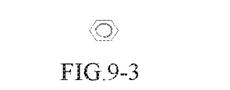
Figure 101:
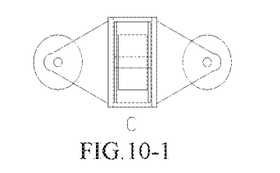
Figure 102:
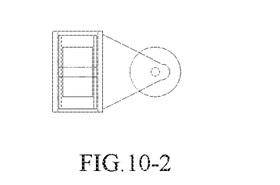
Figure 103:
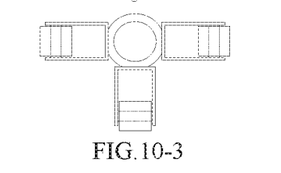

The microseismic monitoring system provided by the present invention, the structure of which is shown in from FIG. 1 to FIG. 10-3, includes microseismic sensor 1, push rod 2 that is set at both ends of the microseismic sensor 1 through the first connecting mechanism for sending the microseismic sensor 1 into a monitoring hole, guide mechanism 3 that is installed on the push rod for guiding the microseismic sensor 1 into the monitoring hole, and microseismic monitoring computer 4 connecting with the microseismic sensor signal. The microseismic sensor is a reusable microseismic sensor and includes microseismic probe 1-1, probe sleeve 1-8 to hold the microseismic probe 1-1, end cover 1-2 to fix the microseismic probe 1-1 in the probe sleeve 1-8, supporting plate 1-3 on the wall of a monitoring hole and second connecting mechanism for connecting the probe sleeve 1-8 to the supporting plate 1-3. The probe sleeve 1-8 includes straight cylinder with an open structure, and cone head. The shape and structure of the inner cavity of the probe sleeve 1-8 are matched with the shape and structure of the microseismic probe 1-1.

The lower surface of the microseismic probe 1-1 which is set inside the probe sleeve 1-8 and the cone end of the microseismic probe 1-1 are exposed. The lower surface of the microseismic probe 1-1 installed in the probe sleeve 1-8 is in contact and coupled with the wall surface of the monitoring hole. The side surface of the supporting plate 1-3 is an arc plate surface. The second connecting mechanism includes two spring sleeves 1-7 that are symmetrically disposed perpendicular to the longitudinal direction of the microseismic probe 1-1 on the probe sleeve 1-8, spring guide rod 1-6 that is set on the non-supported side surface of the supporting plate, and the spring guide rod corresponds to the spring sleeve 1-7 set on probe sleeve 1-8; telescopic spring 1-5 set inside the spring sleeve 1-7 is sleeved on the spring guide rod 1-6; second bolt 1-4 used as a spring seat for the lower end of the telescopic spring 1-5 vertically penetrates the wall of spring sleeve 1-7; and first bolt 1-9 vertically penetrates the spring sleeve 1-7 wall and the spring guide rod 1-6. The first bolt 1-9 and the second bolt 1-4 at each joint of the second connecting mechanism are all integral structural bolt, namely, a bolt rod vertically penetrating all spring sleeve 1-7 walls is used as the second bolt 1-4 at each joint; and a bolt rod vertically penetrating all spring sleeve 1-7 walls and spring guide rods 1-6 is used as the first bolt 1-9 at each joint. The bolt rod acting as the first bolt 1-9 and the bolt rod acting as the second bolt 1-4 are provided with pull cord 1-10 to pull out the bolt rod at the position corresponding to the tail end of the microseismic probe 1-1. One end of the push rod 2 connected with the connecting mechanism is machined into a hexahedral cylinder hole, the other end is machined into a hexahedral cylinder hole connected with an extended connection rod. The connecting mechanism includes a connecting frame 1-11, threaded sleeve 1-12 and connecting rod 2-1. The connecting frame 1-11 includes a ring fixed to a microseismic sensor, a connecting head and two connecting arms with folded structures. The two connecting arms are set symmetrically. One end of each of the two connecting arms is fixed to the ring, the other end is connected with the connecting head. The connecting frame 1-11 is articulated with the threaded sleeve 1-12 through the connecting head. One end of the connecting rod 2-1 is machined into an external thread that is matched with the threaded sleeve 1-12, and the other end is a hexahedral cylinder that is socketed and matched with the hexahedral cylinder hole of the push rod 2. The hexahedral cylinder of the connecting rod 2-1 is fixed in the hexahedral cylinder hole of the push rod 2 through the fastening screw. The guide mechanism 3 is a three-roller guide mechanism. The three rollers are set in two diameters perpendicular to each other to move along the wall of the monitoring hole respectively, one of the rollers is set opposite to the supporting plate 1-3 in the microseismic sensor 1, the other two rollers are set opposite to each other.

When using the microseismic monitoring system provided by the present invention, the microseismic probe 1-1 is first installed into the probe sleeve 1-8 and is fixed in the probe sleeve cavity through the end cover 1-2. Second, the second bolt 1-4 vertically penetrating the spring sleeve 1-7 is used as the lower end spring seat of the telescopic spring 1-5. The spring guide rod 1-6 installed with a telescopic spring 1-5, is inserted into the spring sleeve 1-7 on both sides of the probe sleeve 1-8. The first bolt 1-9 vertically penetrates the wall of the spring sleeve 1-7 and the bolt hole above the spring seat on the spring guide rod 1-6. Therefore, the microseismic probe 1-1 is connected with the supporting plate 1-3, which together form the reusable microseismic sensor 1. Then the push rod 2 is installed at the two ends of the microseismic sensor 1 through the connecting mechanism. The three-roller guide mechanism 3 is installed on the push rod 2. The signal output end of the microseismic sensor 1 is connected with the signal input end of the monitoring computer 4. The microseismic sensor 1 is sent into the monitoring hole by the push rod 2 and the guide mechanism 3 installed on the push rod 2. After the microseismic sensor 1 is in place, the first bolt 1-9 is pulled out by the steel cord tied to the end of the first bolt 1-9. The bottom surface of the microseismic probe 1-1 and the side arc plate surface of the supporting plate 1-3 are effectively coupled with the inner wall of the monitoring hole under the action of the telescopic spring 1-5 in order to monitor the vibration of the rock mass. When it is necessary to recover the microseismic sensor 1, the second bolt 1-4 is pulled out by the steel cord at the end of the bolt rod, which makes the entire telescopic spring 1-5 in a natural shape and relieves the tension of the telescopic spring 1-5 to the supporting plate 1-3. Thus, the effective recovery of the microseismic sensor 1 can be actualized.

It is necessary to point out that the above embodiments are only used for further explanation of the present invention, which can not be understood as the limitation to the scope of protection of the present invention. The technical personnel in the field of technology have made some non-essential improvements and adjustments to the invention according to the contents of the invention, which still belongs to the scope of protection of the present invention.

We claim:

1. A microseismic monitoring system comprising:
   at least a microseismic sensor;
   a push rod; wherein the push rod is set at both ends of the microseismic sensor through a first connecting mechanism for sending the microseismic sensor into a monitoring hole;
   a guide mechanism that is installed on the push rod for guiding the microseismic sensor into the monitoring hole; and
   a microseismic monitoring computer connecting with microseismic sensor signal of the microseismic sensor;
   wherein the microseismic sensor is a reusable microseismic sensor and comprises:
   a microseismic probe;
   a holding part of a microseismic probe;
   a supporting plate supported on a wall surface of the monitoring hole and a second connecting mechanism for connecting the holding part to the supporting plate;
   wherein a lower surface of the microseismic probe and the wall surface of the monitoring hole are in contact and coupled with each other by the holding part;

a side surface of the supporting plate is an arc plate surface; and wherein the second connecting mechanism comprises:
  at least two spring sleeves set along a longitudinal direction of the microseismic probe on the holding part;
  a spring guide rod that is set on a non-supported side surface of the supporting plate, and the spring guide rod corresponds to the spring sleeves set on the holding part;
  a telescopic spring that is set in each of the two spring sleeves located on the spring guide rod;
  a first bolt vertically penetrating a wall of each of at least two spring sleeves and the spring guide rod; and
  a second bolt used as a spring seat for a lower end of the telescopic spring vertically penetrating the wall of each of the at least two spring sleeves;
  wherein the microseismic sensor is set in the monitoring hole;
  when the first bolt is pulled out, the lower surface of the microseismic probe and the arc plate surface of the supporting plate are effectively coupled with an inner wall of the monitoring hole under an action of the telescopic spring in order to monitor vibration of rock mass;
  the first connecting mechanism is a connecting mechanism which makes the push rod swing relative to the microseismic sensor;
  the guide mechanism is a three-roller guide mechanism.

2. The microseismic monitoring system of claim 1, wherein: the holding part is a probe sleeve composed of a straight cylinder with an open structure and a cone head; a shape and a structure of an inner cavity of the probe sleeve are matched with a shape and a structure of the microseismic probe; and the lower surface of the microseismic probe which is set inside the probe sleeve and the cone end of the microseismic probe are exposed.

3. The microseismic monitoring system of claim 2, wherein: the at least two spring sleeves are fixed on a first side and a second side of the probe sleeve in a manner that is symmetrically disposed perpendicular to an axis of the microseismic probe; the structure of all spring sleeves are the same; the structure of all spring guide rods are the same and the structure of all the telescopic springs are the same; and wherein two or three spring sleeves are set on each side of the probe sleeve.

4. The microseismic monitoring system of claim 1, wherein: the end of the probe sleeve is provided with an end cover connected with a sleeve body through a screw threaded pair; and the microseismic probe is fixed in a cavity of the probe sleeve through the end cover.

5. The microseismic monitoring system of claim 1, wherein: a bolt rod perpendicular to the walls of each of the spring sleeves is used as the second bolt at each joint; wherein a bolt rod perpendicular to wall of all spring sleeves and spring guide rods is used as the first bolt at each joint; and wherein the bolt rod acting as the first bolt and the bolt rod acting as the second bolt are provided with a pull cord to pull out the bolt rod at a position corresponding to the tail end of the microseismic probe.

6. The microseismic monitoring system of claim 5, wherein: the spring guide rod is designed with an upper spring seat for the telescopic spring; and the first bolt passes across the spring guide rod through a bolt hole above the upper spring seat.

7. The microseismic monitoring system of claim 5, wherein: each of the at least two spring sleeves are provided with an installation slot which makes the telescopic spring installed in the spring sleeve; and the first bolt is used as an upper spring seat for the telescopic spring in the process of installing the microseismic sensor in the detection and monitoring hole.

8. The microseismic monitoring system of claim 1, wherein the first connecting mechanism comprises:
  a connecting frame;
  a threaded sleeve and a connecting rod;
  a first end of the connection frame is fixed to the first end of the microseismic sensor, and a second end of the connection frame is articulated with a threaded sleeve through a hinged structure;
  one end of the connecting rod is connected with an external thread that is matched with the threaded sleeve, and the other end is a polyhedral cylinder;
  a first end of the push rod connected with the first connecting mechanism is machined into a polyhedral cylinder hole which is socketed and matched with the polyhedral cylinder of the connecting rod, and a second end of the push rod is connected with an extended connection structure; and
  wherein the polyhedral cylinder of the connecting rod is fixed in the polyhedral cylinder hole of the push rod through a fastening screw.

9. The microseismic monitoring system of claim 8, wherein the connecting frame comprises: a ring matched with the microseismic sensor, a connecting head and two connecting arms with folded structures; the two connecting arms are set symmetrically; a first of the connecting arm is fixed to the ring, and a second end of the connecting arm is connected with the connecting head; and wherein the connecting head is articulated with the threaded sleeve, so that the push rod swings relative to the microseismic sensor.

10. The microseismic monitoring system of claim 1, wherein: the guide mechanism is a three-roller guide mechanism; three rollers of the three-roller guide mechanism are set in two diameters perpendicular to each other to move along the wall of the monitoring hole respectively, wherein one of the rollers is set opposite to the supporting plate in the microseismic sensor, and the other two rollers are set opposite to each other.

11. The microseismic monitoring system of claim 2, wherein the first connecting mechanism comprises:
  a connecting frame;
  a threaded sleeve and a connecting rod;
  a first end of the connection frame is fixed to the first end of the microseismic sensor, and a second end of the connecting frame is articulated with a threaded sleeve through a hinged structure;
  a first end of the connecting rod is connected with an external thread that is matched with the threaded sleeve, and a second end of the connecting rod is a polyhedral cylinder;
  a first end of the push rod connected with the first connecting mechanism is machined into a polyhedral cylinder hole which is socketed and matched with the polyhedral cylinder of the connecting rod, and a second end of the push rod is connected with an extended connection structure; and
  wherein the polyhedral cylinder of the connecting rod is fixed in the polyhedral cylinder hole of the push rod through a fastening screw.

12. The microseismic monitoring system of claim 3, wherein the first connecting mechanism comprises:
  a connecting frame;
  a threaded sleeve and a connecting rod;

a first end of the connection frame is fixed to the first end of the microseismic sensor, and a second end of the connection frame is articulated with a threaded sleeve through a hinged structure;

a first end of the connecting rod is connected with an external thread that is matched with the threaded sleeve, and a second end of the connecting rod is a polyhedral cylinder;

a first end of the push rod connected with the first connecting mechanism is machined into a polyhedral cylinder hole which is socketed and matched with the polyhedral cylinder of the connecting rod, and a second end of the push rod is connected with an extended connection structure; and wherein the polyhedral cylinder of the connecting rod is fixed in the polyhedral cylinder hole of the push rod through a fastening screw.

13. The microseismic monitoring system of claim 4, wherein the first connecting mechanism comprises:
a connecting frame;
a threaded sleeve and a connecting rod;
a first end of the connection frame is fixed to the first end of the microseismic sensor, and a second end of the connecting frame is articulated with a threaded sleeve through a hinged structure;
a first end of the connecting rod is connected with an external thread that is matched with the threaded sleeve, and a second end of the connecting rod is a polyhedral cylinder;
a first end of the push rod connected with the first connecting mechanism is machined into a polyhedral cylinder hole which is socketed and matched with the polyhedral cylinder of the connecting rod, and a second end of the push rod is connected with an extended connection structure; and
wherein the polyhedral cylinder of the connecting rod is fixed in the polyhedral cylinder hole of the push rod through a fastening screw.

14. The microseismic monitoring system of claim 5, wherein the first connecting mechanism comprises:
a connecting frame;
a threaded sleeve and a connecting rod;
a first end of the connection frame is fixed to the first end of the microseismic sensor, and a second end of the connecting frame is articulated with a threaded sleeve through a hinged structure;
a first end of the connecting rod is connected with an external thread that is matched with the threaded sleeve, and a second end of the connecting rod is a polyhedral cylinder;
a first end of the push rod connected with the first connecting mechanism is machined into a polyhedral cylinder hole which is socketed and matched with the polyhedral cylinder of the connecting rod, and a second end of the push rod is connected with an extended connection structure; and
wherein the polyhedral cylinder of the connecting rod is fixed in the polyhedral cylinder hole of the push rod through a fastening screw.

15. The microseismic monitoring system of claim 6, wherein the first connecting mechanism comprises:
a connecting frame;
a threaded sleeve and a connecting rod;
a first end of the connection frame is fixed to the first end of the microseismic sensor, and a second end of the connecting frame is articulated with a threaded sleeve through a hinged structure;

a first end of the connecting rod is connected with an external thread that is matched with the threaded sleeve, and a second end of the connecting rod is a polyhedral cylinder;
a first end of the push rod connected with the first connecting mechanism is machined into a polyhedral cylinder hole which is socketed and matched with the polyhedral cylinder of the connecting rod, and a second end of the push rod is connected with an extended connection structure; and
wherein the polyhedral cylinder of the connecting rod is fixed in the polyhedral cylinder hole of the push rod through a fastening screw.

16. The microseismic monitoring system of claim 7, wherein the first connecting mechanism comprises:
a connecting frame;
a threaded sleeve and a connecting rod;
a first end of the connection frame is fixed to the first end of the microseismic sensor, and a second end of the connecting frame is articulated with a threaded sleeve through a hinged structure;
a first end of the connecting rod is connected with an external thread that is matched with the threaded sleeve, and a second end of the connecting rod is a polyhedral cylinder;
a first end of the push rod connected with the first connecting mechanism is machined into a polyhedral cylinder hole which is socketed and matched with the polyhedral cylinder of the connecting rod, and a second end of the push rod is connected with an extended connection structure; and
wherein the polyhedral cylinder of the connecting rod is fixed in the polyhedral cylinder hole of the push rod through a fastening screw.

17. The microseismic monitoring system of claim 2, wherein: the guide mechanism is a three-roller guide mechanism; three rollers of the three-roller guide mechanism are set in two diameters perpendicular to each other to move along the wall of the monitoring hole respectively, wherein one of the rollers is set opposite to the supporting plate in the microseismic sensor, and the other two rollers are set opposite to each other.

18. The microseismic monitoring system of claim 3, wherein: the guide mechanism is a three-roller guide mechanism; three rollers of the three-roller guide mechanism are set in two diameters perpendicular to each other to move along the wall of the monitoring hole respectively, wherein one of the rollers is set opposite to the supporting plate in the microseismic sensor, and the other two rollers are set opposite to each other.

19. The microseismic monitoring system of claim 4, wherein: the guide mechanism is a three-roller guide mechanism; three rollers of the three-roller guide mechanism are set in two diameters perpendicular to each other to move along the wall of the monitoring hole respectively, wherein one of the rollers is set opposite to the supporting plate in the microseismic sensor, and the other two rollers are set opposite to each other.

20. The microseismic monitoring system of claim 5, wherein: the guide mechanism is a three-roller guide mechanism; three rollers of the three-roller guide mechanism are set in two diameters perpendicular to each other to move along the wall of the monitoring hole respectively, wherein one of the rollers is set opposite to the supporting plate in the microseismic sensor, and the other two rollers are set opposite to each other.

* * * * *